(12) United States Patent
Davies et al.

(10) Patent No.: US 6,353,827 B1
(45) Date of Patent: Mar. 5, 2002

(54) METHODS AND/OR SYSTEMS FOR SELECTING DATA SETS

(75) Inventors: Nicholas John Davies, Colchester; Richard Weeks, Felixstowe, both of (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 09/155,172

(22) PCT Filed: Aug. 28, 1998

(86) PCT No.: PCT/GB98/02611

§ 371 Date: Sep. 22, 1998

§ 102(e) Date: Sep. 22, 1998

(87) PCT Pub. No.: WO99/12108

PCT Pub. Date: Mar. 11, 1999

(30) Foreign Application Priority Data

Sep. 4, 1997 (EP) .............................................. 97306878

(51) Int. Cl.[7] ............................................ G06F 17/30
(52) U.S. Cl. ........................................................... 707/6
(58) Field of Search ..................................... 707/1, 4, 6

(56) References Cited

U.S. PATENT DOCUMENTS

| 5,265,065 A | * | 11/1993 | Turtle | 395/600 |
| 5,418,948 A | * | 5/1995 | Turtle | 395/600 |
| 5,418,951 A | * | 5/1995 | Damashek | 395/600 |
| 5,598,557 A | * | 1/1997 | Doner et al. | 395/605 |
| 5,673,428 A | * | 9/1997 | Hirakawa | 395/605 |
| 5,721,897 A | * | 2/1998 | Rubinstein | 395/602 |
| 5,754,939 A | * | 5/1998 | Herz et al. | 455/4.2 |
| 5,794,233 A | * | 8/1998 | Rubinstein | 707/4 |
| 5,819,260 A | * | 10/1998 | Lu et al. | 707/3 |
| 5,857,184 A | * | 1/1999 | Lynch | 707/4 |
| 5,933,822 A | * | 8/1999 | Braden-Harder et al. | 707/5 |
| 5,956,711 A | * | 9/1999 | Syllivan et al. | 707/6 |
| 6,055,528 A | * | 4/2000 | Evans | 707/3 |

\* cited by examiner

*Primary Examiner*—Thomas Black
*Assistant Examiner*—Mary Wang
(74) *Attorney, Agent, or Firm*—Nixon & Vanderhye P.C.

(57) ABSTRACT

Methods and apparatus for identifying associated key words in a data set. Associated key words are identified by a parser which firstly operates to extract key words from a data set. These key words are then analyzed by the parser to identify which key words, if any, have an association as determined by a predefined set of rules. These rules are grammatical and include, for example, two key words both being nouns that occur one after the other without intervening low value words. A similar rule applies to nouns followed by verbs but does not extend to verbs followed by nouns. These rules allow terms and phrases such as "information technology" and "wide area network" to be identified as associated key words rather than as individual and unrelated key words.

6 Claims, 7 Drawing Sheets

METHODS AND/OR SYSTEMS FOR SELECTING DATA SETS

BACKGROUND OF THE INVENTION

1. Field of the Invention

The present invention relates to methods and/or systems for selecting data sets, which finds particular application in selecting documents for instance from an information base such as that accessible using the Internet.

2. Background of Related Art

The Internet world-wide Web is a known communications system based on a plurality of separate communications networks connected together. It provides a rich source of information from many different providers but this very richness creates a problem in accessing specific information as there is no central monitoring and control.

In 1982, the volume of scientific, corporate and technical information was doubling every 5 years. By 1988, it was doubling every 2.2 years and by 1992 every 1.6 years. With the expansion of the Internet and other networks the rate of increase will continue to increase. Key to the viability of such networks will be the ability to manage the information and provide users with the information they want, when they want it.

The present invention however, is not concerned with providing another tool for searching systems such as the World Wide Web (W3): there are already many of these. They are being added to frequently with ever increasing coverage of the Web and sophistication of search engines.

Instead, embodiments of the present invention relate to the following problem: having found useful information on W3, how can it be stored for easy retrieval and how can other users likely to be interested in the information be identified and informed?

More specifically, the applicant's co-pending application PCT/GB96/00132 provides an information retrieval agent, known as a JASPER agent, that is used for identifying and retrieving information from distributed information systems such as the W3.

It uses techniques, such as hierarchical agglomerative clustering, to define 30 relationships between various sources of information existing on W3. However, inaccuracies can arise within these defined relationships. This can result in documents having dissimilar subject matter being clustered together. The nature of the clustering technique is that one inaccurately clustered document can then multiply into several.

BRIEF SUMMARY OF THE INVENTION

According to a first aspect of the present invention there is provided apparatus for determining a measure of similarity between at least a first and a second data set, said apparatus comprising:

i) input means for receiving at least said first and second data sets;

ii) processing means for identifying a set of keywords in at least the first of the data sets, the processing means having access to at least one rule set and identifying the set of keywords by use of said at least one rule set, the processing means further determining said measure of similarity; and iii) output means to output said measure of similarity wherein said rule set includes a rule concerning relative location of data items in a respective data set, and wherein said processing means determines the measure of similarity by comparing at least one set of key words, identified by said processing means in the first data set, with a set of keywords comprising or derived from said second data set.

Embodiments of the present invention enable two or more keywords within a data set to be associated with each other, for example keywords that form a phrase, with the result that the accuracy in comparison of similarity of data sets may be improved.

Preferably, the apparatus further comprises information retrieval means and a data store, said first data set comprising data retrieved from an information base by said information retrieval means and said second data set comprising a set of key words stored in said data store. For instance, the set of keywords may have been provided by a user, or stored in a user profile.

The rule set may provide means to identify adjacent items in the data set which can be treated together, as a single keyword. This entails not only location information but also, for instance, a grammatical test on adjacent items such as one or more of the following:

1) a noun followed by a noun or a predetermined set of indicia;
2) a verb followed by a noun or a predetermined set of indicia;
3) an adjective followed by a noun or a predetermined set of indicia; and
4) a predetermined set of indicia followed by a noun or a verb or a further predetermined set of indicia.

According to a second aspect of the present invention there is provided a 5 method of determining a level of similarity between first and second data sets, wherein said method comprises the steps of:

i) applying identifying tags to selected data items in at least the first of the data sets, in accordance with at least a first rule;

ii) identifying a set of potential key words by reference to either the presence or the absence of said identifying tags;

iii) selecting sets of two or more potential keywords which are adjacent by applying at least a second rule;

iv) classifying each selected set of potential keywords as a single keyword;

v) generating a set of keywords which comprises each classified set of potential keywords as a single keyword, together with the remaining keywords from the identified set of potential keywords; and vi) comparing the generated set of keywords with a set of keywords either comprising or derived from the second data set.

For instance, said first rule may advantageously relate at least in part to the grammatical category of the data items.

Said at least a second rule may comprise one or more rules from the following set:

1) a noun followed by a noun or a predetermined set of indicia;
2) a verb followed by a noun or a predetermined set of indicia;
3) an adjective followed by a noun or a predetermined set of indicia; and
4) a predetermined set of indicia followed by a noun or a verb or a further predetermined set of indicia.

Identifying associated key words within documents, and other forms of information, located on W3 and other information bases, provides improvements in the accuracy of the relationships defined between these documents, and other forms of information, compared with prior art systems and methods.

BRIEF DESCRIPTION OF THE DRAWINGS

A method and/or system for selecting data sets will now be described, by way of example only, with reference to the accompanying Figures in which.

DETAILED DESCRIPTION

Embodiments of the present invention provide improvements to information access and information retrieval systems, such as the JASPER agent described below. A description of the embodiments of the present invention is provided subsequent to the description of this JASPER agent.

The present invention however, is not limited to JASPER agents. It has further application in other areas, such as information systems that employ user profiling techniques and information systems employing key word retrieval and key word searching techniques.

An Information Access System

Software agents provide a known approach to dealing with distributed rather than centralised computer-based systems. Each agent generally comprises functionality to perform a task or tasks on behalf of an entity (human or machine-based) in an autonomous manner, together with local data, or means to access data, to support the task or tasks. In the present specification, agents for use in storing or retrieving information in embodiments of the present invention are referred to for simplicity as "Jasper agents", this stemming from the acronym "Joint Access to Stored Pages with Easy Retrieval".

Given the vast amount of information available on W3, it is preferable to avoid the copying of information from its original location to a local server. Indeed, it could be argued that such an approach is contrary to the whole ethos of the Web. Rather than copying information, therefore, Jasper agents store only relevant "meta-information". As will be seen below, this meta-information can be thought of as being at a level above information itself, being about it rather than being actual information. It can include for instance keywords, a summary, document title, universal resource locator (URL) and date and time of access. This meta-information is then used to provide a pointer to, or to "index on", the actual information when a retrieval request is made.

Most known W3 clients (Mosaic™ and Netscape™ for example) provide some means of storing information about pages of interest to the user. Typically, this is done by allowing the user to create a (possibly hierarchical) menu of names associated with particular URLs. While this menu facility is useful, it quickly becomes unwieldy when a reasonably large number of W3 pages are involved. Essentially, the representation provided is not rich enough to allow capture of all that might be required about the information stored: the user can only provide a string naming the page. As well as the fact that useful meta-information such as the date of access of the page is lost, a single phrase (the name) may not be enough to accurately index a page in all contexts.

Consider as a simple example information about the use of knowledge-based systems (KBS) in information retrieval of pharmacological data: in different contexts, it may be any of KBS, information retrieval or pharmacology which is of interest. Unless a name is carefully chosen to mention all three aspects, the information will be missed in one of more of its useful contexts. This problem is analogous to the problem of finding files containing desired information in a Unix (or other) file system as described in the paper by Jones, W. P.; "On the applied use of human memory models: the memory extender personal filing system" published in Int J. Man-Machine Studies, 25, 191–228, 1986. In most filing systems however there is at least the facility of sorting files by creation date.

The solution to this problem adopted in embodiments of the JASPER agent is to allow the user to access information by a much richer set of meta-information.

Figure 1:
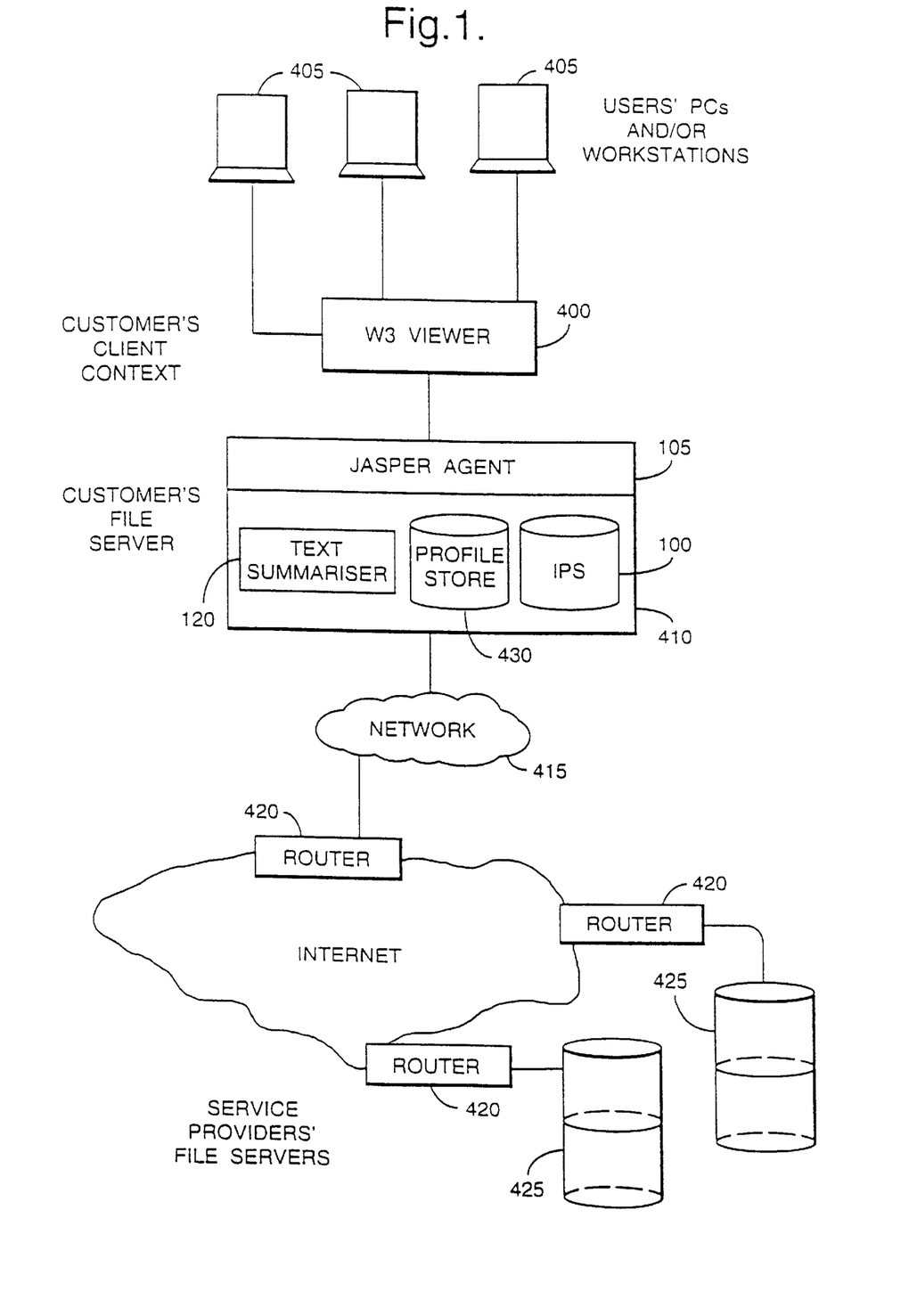
FIG. 1 shows an information access system incorporating a Jasper agent system.

Referring to FIG. 1, an information access system according to an embodiment of the present invention may be built into a known form of information retrieval architecture, such as a client-server type architecture connected to the Internet.

In more detail, a customer, such as an international company, may have multiple users equipped with personal computers or workstations 405. These may be connected via a World Wide Web (WWW) viewer 400 in the customer's client context to the customer's WWW file server 410. The Jasper agent 105, effectively an extension of the viewer 400, may be actually resident on the WWW file server 410.

The customer's WWW file server 410 is connected to the Internet in known manner, for instance via the customer's own network 415 and a router 420. Service providers' file servers 425 can then be accessed via the Internet, again via routers.

Also resident on, or accessible by, the customer's file server 410 are a text summarising tool 1 20 and two data stores, one holding user profiles (the profile store 430) and the other (the intelligent page store 100) holding principally meta-information for a document collection.

In a Jasper agent based system, the agent 105 itself can be built as an extension of a known viewer such as Netscape. The agent 105 is effectively integrated with the viewer 400, which might be provided by Netscape or by Mosaic etc, and can extract W3 pages from the viewer 400.

As described above, in the client-server architecture, the text summariser 120 and the user profile both sit on file in the customer file server 410 where the Jasper agent is resident. However, the Jasper agent 105 could alternatively appear in the customer's client context.

A Jasper agent, being a software agent, can generally be described as a software entity, incorporating functionality for performing a task or tasks on behalf of a user, together with local data, or access to local data, to support that task or tasks. The tasks relevant in a Jasper system, one or more of which may be carried out by a Jasper agent, are described below. The local data will usually include data from the intelligent page store 100 and the profile store 430, and the functionality to be provided by a Jasper agent will generally include means to apply a text summarising tool and store the results, access or read, and update, at least one user profile, means to compare keyword sets with other keyword sets, or meta-information, and means to trigger alert messages to users.

In preferred embodiments, a Jasper agent will also be provided with means to monitor user inputs for the purpose of selecting a keyword set to be compared.

In further preferred embodiments, a Jasper agent is provided with means to apply an algorithm in relation to first and second keyword sets to generate a measure of similarity therebetween. According to the measure of similarity, either the first or second keyword sets may then be proactively updated by the Jasper agent, or the result of comparing the first or second keyword sets with a third keyword set, or with meta-information, may be modified.

Embodiments of the present invention might be built according to different software systems. It might be convenient for instance that object-oriented techniques are applied. However, in embodiments as described below, the server will be Unix based and able to run ConTex™, a known natural language processing system offered by Oracle Corporation, and a W3 viewer. The system might generally be implemented in "C" although the client might potentially be any machine which can support a W3 viewer.

In the following section, the facilities which Jasper agents offer the user in managing information are discussed. These can be grouped in two categories, storage and retrieval.

Storage

Figure 2:
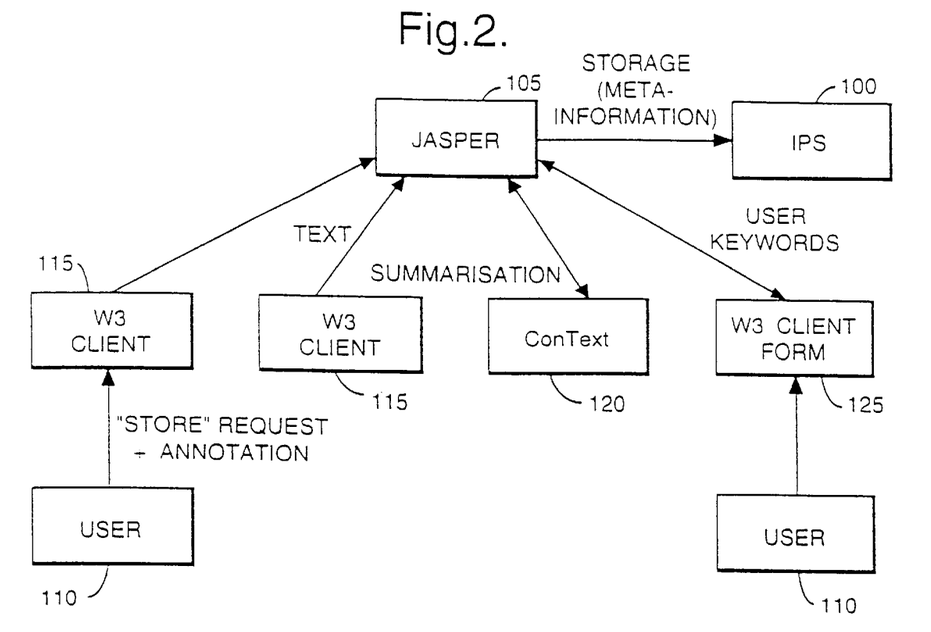
FIG. 2 shows in schematic format a storage process offered by the access system.
Figure 5:
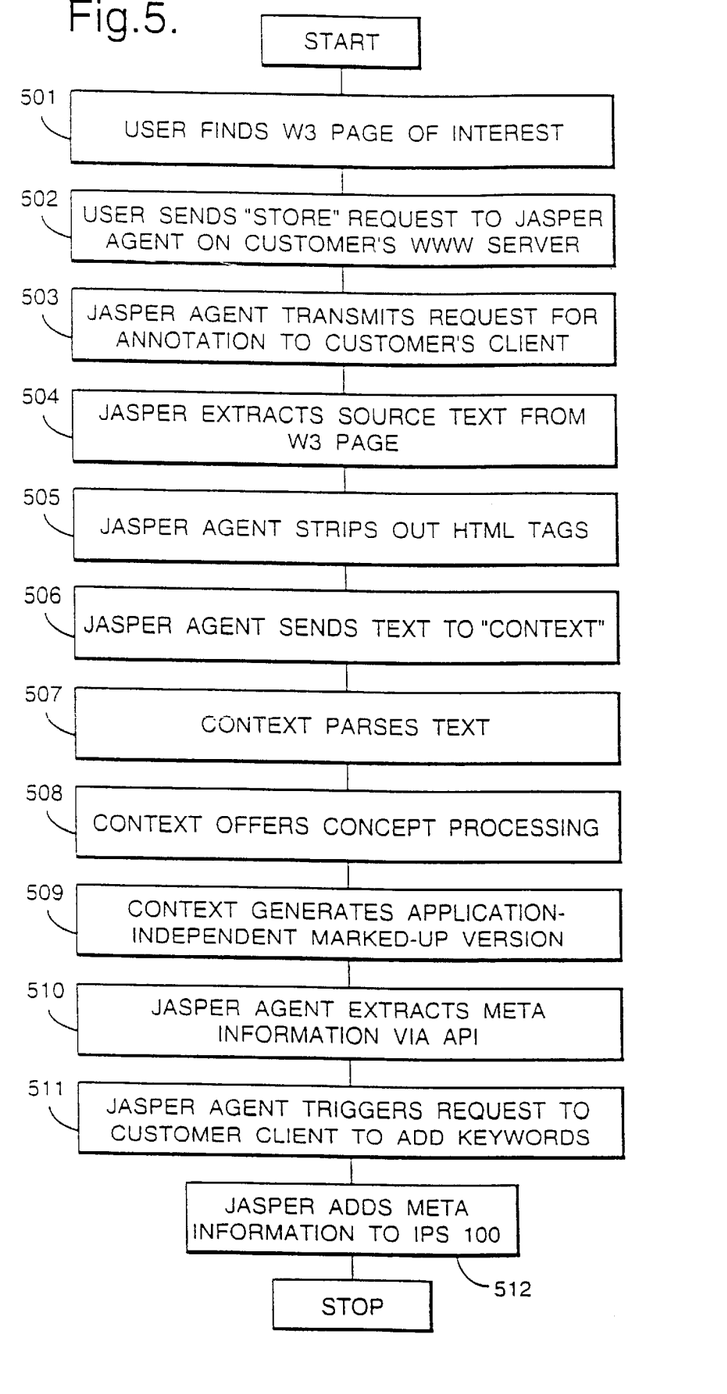
FIG. 5 shows a flow diagram for the storage process of FIG. 2.
Figure 6:
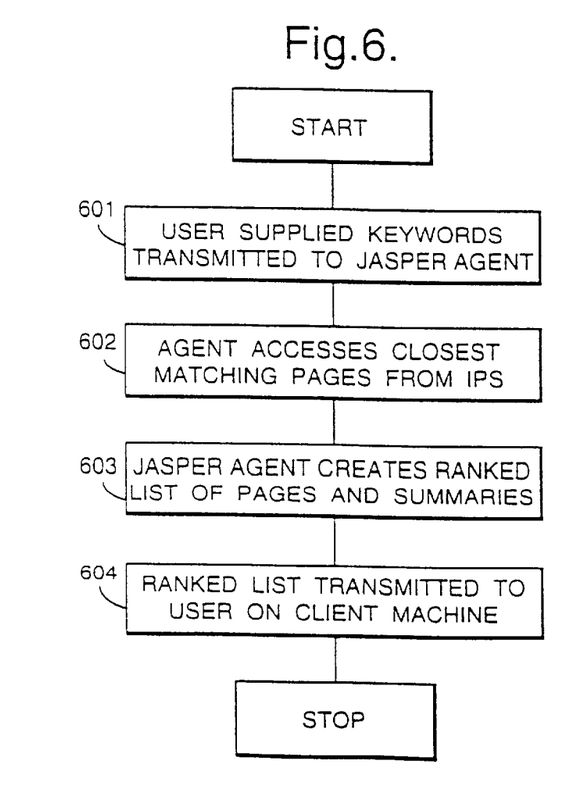
FIGS. 6, 7 and 8 show flow diagrams for three information retrieval processes using a Jasper access system.

FIGS. 2 and 5 show the actions taken when a Jasper agent 105 stores information in an intelligent page store (IPS) 100. The user 110 first finds a W3 page of sufficient interest to be stored by the Jasper system in an IPS 100 associated with that user (STEP 501). The user 110 then transmits a 'store' request to the Jasper agent 105, resident on the customer's WWW file server 410 via a menu option on the user's selected W3 client 115 (Mosaic and Netscape versions are currently available on all platforms) (STEP 502). The Jasper agent 105 then invites the user 1 10 to supply an associated annotation, also to be stored (STEP 503). Typically, this might be the reason the user is interested in the page and can be very useful for other users in deciding which pages retrieved from the IPS 100 to visit. (Information sharing is further discussed below.)

The Jasper agent 105 next extracts the source text from the page in question, again via the W3 client 115 on W3 (STEP 504). Source text is provided in a "HyperText" format and the Jasper agent 105 first strips out HyperText Markup Language (HTML) tags (STEP 505). The Jasper agent 105 then sends the text to a text summariser such as "ConText" 120 (STEP 506).

ConText 120 first parses a document to determine the syntactic structure of each sentence (STEP 507). The ConText parser is robust and able to deal with a wide range of the syntactic phenomena occurring in English sentences. Following sentence level parsing, ConText 120 enters its 'concept processing' phase (STEP 508). Among the facilities offered are:

Information Extraction: a master index of a document's contents is computed, indexing over concepts, facts and definitions in the text.

Content Reduction: several levels of summarisation are available, ranging from a list of the document's main themes to a precis of the entire document.

Discourse Tracking: by tracking the discourse of a document, ConText can extract all the parts of a document which are particularly relevant to a certain concept.

ConText 120 is used by the Jasper agent 105 in a client-server architecture: after parsing the documents, the server generates application-independent marked-up versions (STEP 509). Calls from the Jasper agent 105 using an Applications Programming Interface (API) can then interpret the mark-ups. Using these API calls, meta-information is obtained from the source text (STEP 510). The Jasper agent 105 first extracts a summary of the text of the page. The size of the summary can be controlled by the parameters passed to ConText 120 and the Jasper agent 105 ensures that a summary of 100–150 words is obtained. Using a further call to ConText 120, the Jasper agent 105 then derives a set of keywords from the source text. Following this, the user may optionally be presented with the opportunity to add further keywords via an HTML form 125 (STEP 511). In this way, keywords of particular relevance to the user can be provided, while the Jasper agent 105 supplies a set of keywords which may be of greater relevance to a wider community of users.

At the end of this process, the Jasper agent 105 has generated the following meta-information about the W3 page of interest:

the ConText-supplied general keywords;

user-specific keywords;

the user's annotations;

a summary of the page's content;

the document title;

universal resource location (URL) and date and time of storage.

Figure 3:
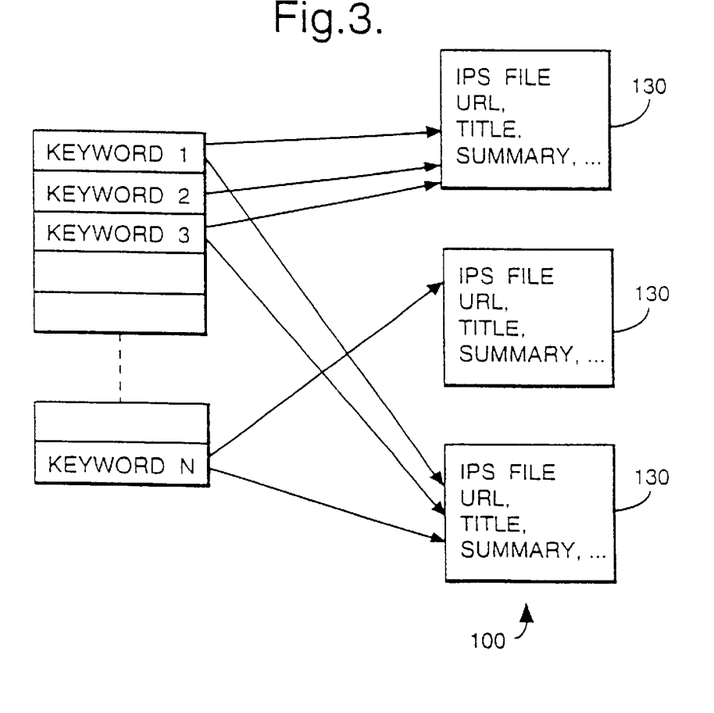
FIG. 3 shows the structure of an intelligent page store for use in the storage process of FIG. 1.
Figure 4:
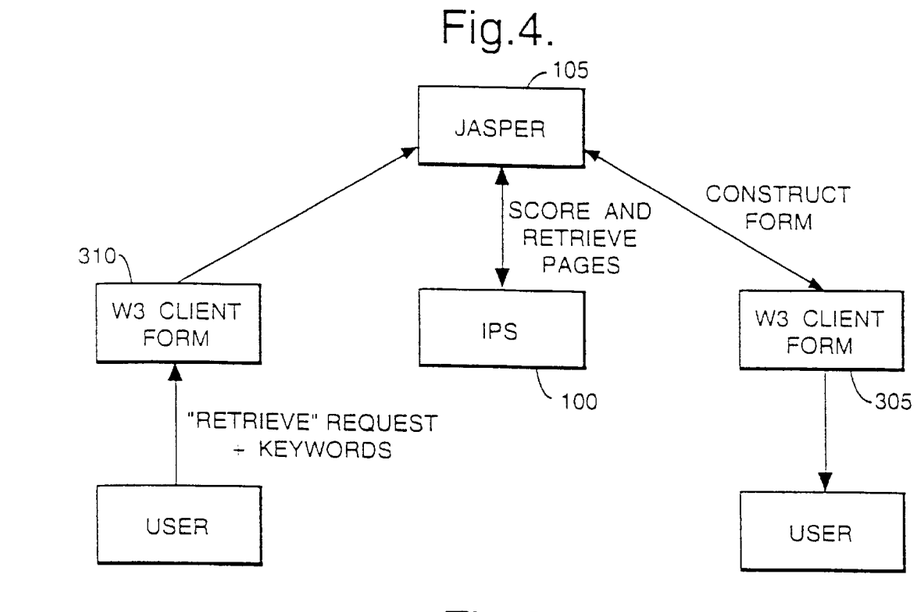
FIG. 4 shows in schematic format retrieval processes offered by the access system.

Referring additionally to FIG. 3, the Jasper agent 105 then adds this meta-information for the page to files 130 of the IPS 100 (STEP 512). In the IPS 100, the keywords (of both types) are then used to index on files containing meta-information for other pages.

Retrieval

There are three modes in which information can be retrieved from the IPS 100 using a Jasper agent 105. One is a standard keyword retrieval facility, while the other two are concerned with information sharing between a community of agents and their users. Each will be described in the sections below.

When a Jasper agent 105 is installed on a user's machine, the user provides a personal profile: a set of keywords which describe information the user is interested in obtaining via W3. This profile is held, or at least maintained, by the agent 105 in order to determine which pages are potentially of interest to a user.

Keyword Retrieval

As shown in FIGS. 4, 6, 7 and 8, for straightforward keyword retrieval, the user supplies a set of keywords to the Jasper agent 105 via an HTML form 300 provided by the Jasper agent 105 (STEP 601). The Jasper agent 105 then retrieves the ten most closely matching pages held in IPS 100 (STEP 602), using a simple keyword matching and scoring algorithm. Keywords supplied by the user when the page was stored (as opposed to those extracted automatically by ConText) can be given extra weight in the matching process. The user can specify in advance a retrieval threshold below which pages will not be displayed. The agent 105 then dynamically constructs an HTML form 305 with a ranked list of links to the pages retrieved and their summaries (STEP 603). Any annotation made by the original user is also shown, along with the scores of each retrieved page. This page is then presented to the user on their W3 client (STEP 604).

"What's New?" Facility

Figure 7:
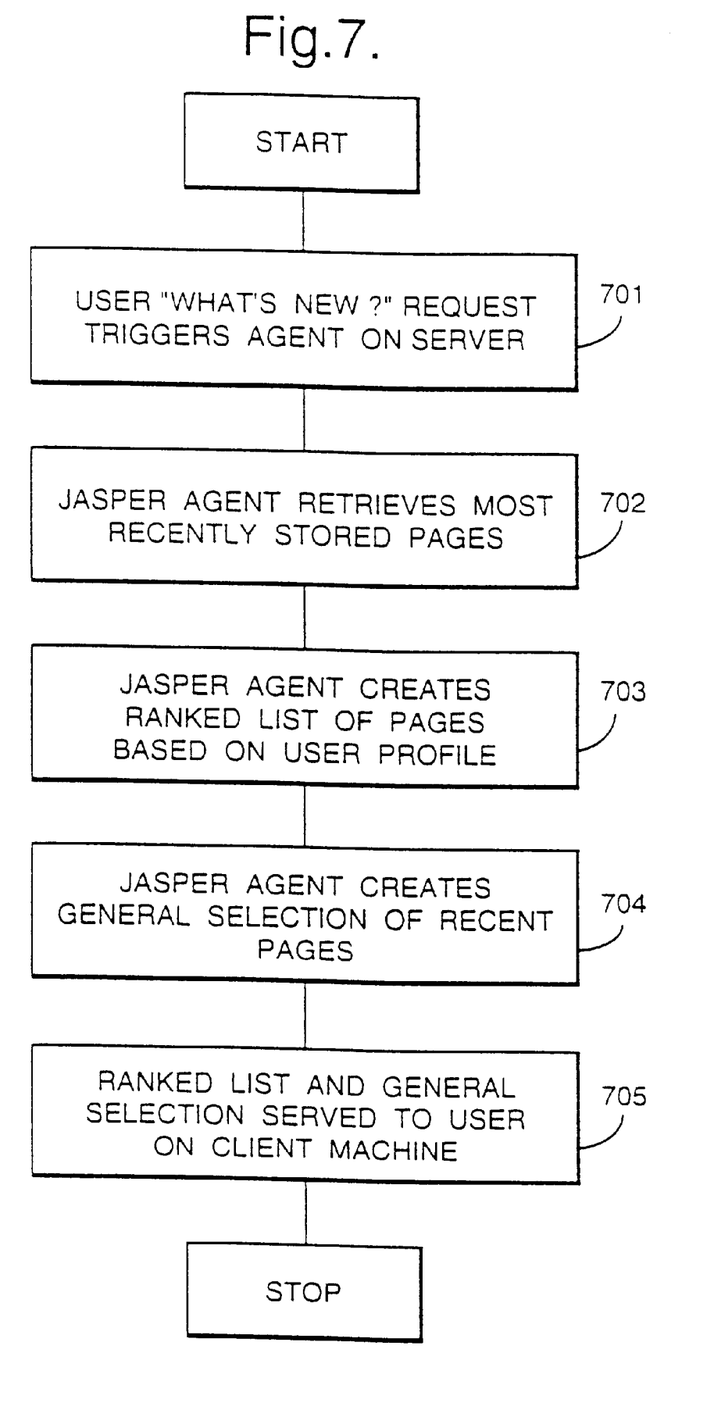

Any user can ask a Jasper agent "What's new?" (STEP 701). The agent 105 then interrogates the IPS 100 and retrieves the most recently stored pages (STEP 702). It then determines which of these pages best match the user's profile, again based on a simple keyword matching and scoring algorithm (STEP 703). An HTML page is then presented to the user showing a ranked list of links to the recently stored pages which best match the user's profile, and also to other pages most recently stored in IPS (STEP 704), with annotations where provided. Thus the user is provided with a view both of the pages recently stored and likely to be of most interest to the user, and a more general selection of recently stored pages (STEP 705).

A user can update the profile which his Jasper agent 105 holds at any time via an HTML form which allows him to add and/or delete keywords from the profile. In this way, the user can effectively select different "contexts" in which to work. A context is defined by a set of keywords (those making up the profile, or those specified in a retrieval query) and can be thought of as those types of information which a user is interested in at a given time.

The idea of applying human memory models to the filing of information was explored by Jones in the paper referenced above, in the context of computer filing systems. As he pointed out in the context of a conventional filing system, there is an analogy between a directory in a file system and a set of pages retrieved by a Jasper agent 105. The set of pages can be thought of as a dynamically-constructed directory, defined by the context in which it was retrieved. This is a highly flexible notion of 'directory' in two senses: first, pages which occur in this retrieval can of course occur in others, depending on the context; and, second, there is no sharp boundary to the directory: pages are 'in' the directory to a greater or lesser extent depending on their match to the current context. In the present approach, the number of ways of partitioning the information on the pages is thus only limited by the diversity and richness of the information itself.

Communication with Other Interested Agents

Figure 8:
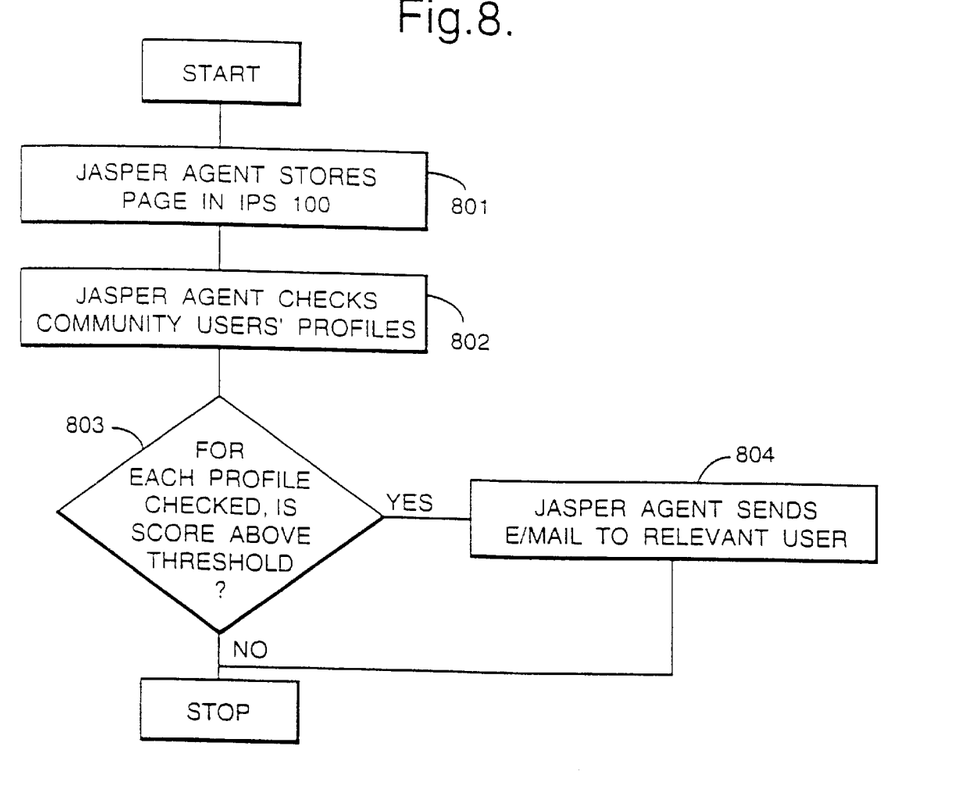

Referring to FIG. 8, when a page is stored in IPS 100 by a Jasper agent 105 (STEP 801), the agent 105 checks the profiles of other agents' users in its 'local community' (STEP 802). This local community could be any predetermined community. If the page matches a user's profile with a score above a certain threshold (STEP 803), a message, for instance an "email" message, can be automatically generated by the agent 105 and sent to the user concerned (STEP 804), informing him of the discovery of the page.

The email header might be for instance in the format:
Jasper KW: (keywords)
This allows the user before reading the body of the message to identify it as being one from the Jasper system. Preferably, a list of keywords is provided and the user can assess the relative importance of the information to which the message refers. The keywords in the message header vary from user to user depending on the keywords from the page which match the keywords in their user profile, thus personalising the message to each user's interests. The message body itself can give further information such as the page title and URL, who stored the page and any annotation on the page which the storer provided.

The Jasper agent 105 and system described above provide the basis for an extremely useful way of accessing relevant information in a distributed arrangement such as W3. Variations and extensions may be made in a system without departing from the scope of the present invention. For instance, at a relatively simple level, improved retrieval techniques might be employed. As examples, vector space or probabilistic models might be used, as described by G Salton in "Automatic Text Processing", published in 1989 by Addison-Wesley in Reading, Mass., USA.

Alternatively, indexing might be made more versatile by providing indexing on meta-information other than keywords. For instance, extra meta-information might be the date of storage of a page and the originating site of the page (which Jasper can extract from the URL.) These extra indices allow users (via an HTML form) to frame commands of the type:

Show me all pages 1 stored in 1994 from Cambridge University about artificial intelligence and information retrieval.

In another alternative version, a thesaurus might be used by Jasper agents 105 to exploit keyword synonyms. This reduces the importance of entering precisely the same keywords as were used when a page was stored. Indeed, it is possible to exploit the use of a thesaurus in several other areas, including the personal profiles which an agent 105 holds for its user.

Adaptive Agents

The use of user profiles by Jasper agents 105 to determine information relevant to their users, though powerful can be improved. When the user wants to change context (perhaps refocussing from one task to another, or from work to leisure), the user profile must be re-specified by adding and/or deleting keywords. A better approach is for the agent to change the user's profile as the interests of the user change over time. This change of context can occur in two ways: there can be a short-term switch of context from, for example, work to leisure. The agent can identify this from a list of current contexts it holds for a user and change into the new context. This change could be triggered, for example, when a new page of different information type is visited by the user. There can also be longer term changes in the contexts the agent holds based on evolving interests of the user. These changes can be inferred from observation of the user by the agent. For instance, known techniques which might be employed in an adaptive agent include genetic algorithms, learning from feedback and memory-based reasoning. Such techniques are disclosed in an internal report of the MIT made available in 1993, by Sheth B. & Maes. P., called "Evolving Agents for Personalised Information Filtering".

Integration of Remote and Local Information

Another possible variation of a Jasper system would be to integrate the user's own computer filing system with the IPS 100, so that information found on W3 and on the local machine would appear homogenous to the user at the top level. Files could then be accessed similarly to the way in which Jasper agents 105 access W3 pages, freeing the user from the constraints of name-oriented filing systems and providing a contents-addressable interface to both local and remote information of all kinds.

Clustering in Jasper Systems

The Jasper IPS 100 and the related documents can essentially be called a collection; it is a set of documents indexed by keywords. It differs from a 'traditional' collection in that the documents are typically located remotely from the index; the index (the IPS 100) actually points to a URL which specifies the location of the document on the Internet. Furthermore, various additional pieces of meta-information are attached to documents in a Jasper system, such as the user who stored the page, when it was stored, any annotation the user may have provided and so forth.

One important area where a Jasper system differs from most document collections is that each document has been entered in the IPS 100 by a user who made a conscious decision to mark it as a piece of information which he and his peers would be likely to find useful in the future. This, along with the meta-information held, makes a Jasper IPS 100 a very rich source of information.

It has also been examined whether known Information Retrieval (IR) techniques can beneficially applied to the Jasper IPS 100. In particular, the use of clustering has been under investigation.

Clustering Documents

Using known IR techniques, Jasper's term-document matrix can be used to calculate a similarity matrix for the documents identified in the Jasper IPS 100. The similarity matrix gives a measure of the similarity of documents identified in the store. For each pair of documents the Dice coefficient is calculated. For two documents Di and Dj.

$$2* [Di \cap Dj]/[Di]+[Dj]$$

where [X] is the number of terms in X and X∩Y is the number of terms co-occurring in X and Y. This coefficient yields a number between 0 and 1. A coefficient of zero implies two documents have no terms in common, while a coefficient of 1 implies that the sets of terms occurring in each document are identical. The similarity matrix, Sim say, represents the similarity of each pair of documents in the store, so that for each pair of documents i and j.

$$Sim (i,j)=2* [Di \cap Dj]/[Di]+[Dj]$$

This matrix can be used to create clusters of related documents automatically, using the hierarchical agglomerative clustering process described in "Hierarchic Agglomerative Clustering Methods for Automatic Document Classification" by Griffiths A et al in the Journal of Documentation, 40:3, September 1984, pp 176–205. In such a process, each document is initially placed in a cluster by itself and the two most similar such clusters are then combined into a larger cluster, for which similarities with each of the other clusters must then be computed. This combination process is continued until only a single cluster of documents remains at the highest level.

The way in which similarity between clusters (as opposed to individual documents) is calculated can be varied. For a Jasper store, "complete-link clustering" can be employed. In complete-link clustering, the similarity between the least similar pair of documents from the two clusters is used as the cluster similarity.

The resulting cluster structures of the Jasper store can then be used to create a three-dimensional (3D) front end onto the Jasper system using the VRML (Virtual Reality Modelling Language). (VRML is a known language for 3D graphical spaces or virtual worlds networked via the global Internet and hyperlinked within the World Wide Web).

Clustering Keywords

Keywords (terms) occurring in relation to a particular Jasper document collection can also be clustered in a way which mirrors exactly the document cluster technique described above: a similarity matrix for the keywords in the Jasper store can be constructed which gives a measure of the 'similarity' of keywords in the store. For each pair of documents, the Dice coefficient is calculated. For two keywords Ki and Kj, the Dice coefficient is given by:

$$2* [Ki \cap Kj]/[Ki]+[Kj]$$

where [X] is the number of documents in which X occurs and X∩Y is the number of documents in which X and Y co-occur.

Once the similarity matrix for a Jasper store is calculated, however, it is not necessary to cluster the keywords as the documents were clustered. Instead it is possible to exploit the matrix itself in two ways, described below.

The first way is profile enhancement. Here, the user profile can be enhanced by using those keywords most similar to the keywords in the user's profile. Thus for example, if the words virtual, reality and Internet are part of a user's profile but VRML is not, an enhanced profile might add VRML to the original profile (assuming VRML is clustered close to virtual, reality and Internet). In this way, documents containing VRML but not virtual, reality and Internet may be retrieved whereas they would not have been with the unenhanced profile.

Figure 9:
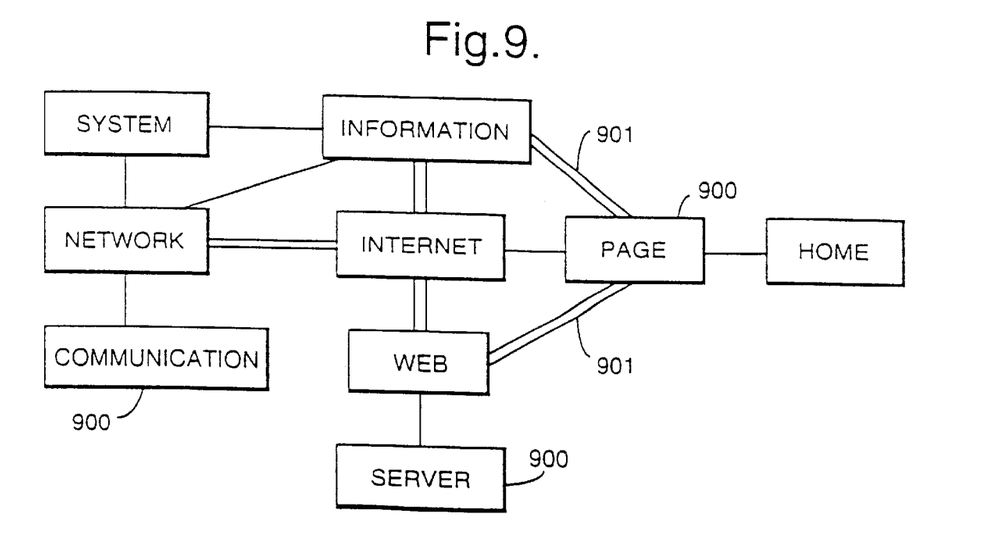
FIG. 9 shows a keyword network generated using a clustering technique, for use in extending and/or applying user profiles in a Jasper system.

FIG. 9 shows an example network of keywords 900 which has been built from the keyword similarity matrix extracted from a current Jasper store. The algorithm is straightforward: given an initial starting keyword, find the four words most similar to it from the similarity matrix. Link these four to the original word and repeat the process for each of the four new words. This can be repeated a number of times (in FIG. 9, three times). Double lines 901 between two words indicate that both words occur in the other's four most similar keywords. One could of course attach the particular similarity coefficients to each link for finer-grained information concerning the degree of similarity between words.

The second way is proactive searching. The keywords comprising a user's profile can be used to search for new WWW pages relevant to their interest proactively by Jasper, which can then present a list of new pages which the user may be interested in without the user having to carry out a search explicitly. These proactive searches can be carried out by a Jasper system at some given interval, such as weekly. Clustering is useful here because a profile may reflect more than one interest. Consider, for example, the following user profile: Internet, WWW, html, football, Manchester, united, linguistics, parsing, pragmatics. Clearly, three separate interests are represented in the above profile and searching on each separately is likely to yield far superior results than merely entering the whole profile as a query for the given user. Clustering keywords from the document collection can automate the process of query generation for proactive searching by a user's Jasper agent.

When the search results are obtained by Jasper, they can be summarised and matched against the user's profile in the usual way to give a prioritised list of new URLs along with locally held summaries.

Improvements to the JASPER System

Embodiments of the present invention provide improvements to the JASPER system above. These embodiments will now be described with reference to FIG. 10, which identifies elements within the Jasper agent that are used to identify associated key words within a document that may improve the performance of the Jasper system above.

The above clustering techniques can be enhanced by identifying two or more keywords that are associated with each other, for example keywords that form a phrase. These associated keywords are then entered into the document-term matrix as single terms.

For example, a standard clustering technique would consider that the expression "Information Technology" forms two separate entries in a document-term matrix, namely separate entries of "Information" and "Technology". A technique enhanced according to an embodiment of the present invention would recognise that the words "Information" and "Technology" are associated and should form a single entry in a document-term matrix. Replacing two entries with a single entry can significantly alter the value of the Dice co-efficient used for measuring the similarity between documents.

For example, consider the following two paragraphs:

1) The <u>people</u> in my <u>company</u> only use the <u>latest information technology</u> when <u>transferring copies</u> of <u>files</u> across our <u>local area network</u>.

2) My <u>company</u> has <u>transferred</u> a lot of <u>people</u> into the <u>latest areas</u> of <u>technology</u>. There is a <u>file</u> on the <u>network</u> with a lot of <u>information</u> in it about the <u>transfers</u>. I also have a <u>local copy</u> of the <u>file</u>.

Clearly, the subject matter of each paragraph is different, yet each paragraph has the same keywords, namely "people", "company", "latest", "information", "technology", "copy", "transfer", "file", "local", "area" and "network".

If the keywords "information" and "technology" and "local", "area" and "network" are treated as independent keywords (as per standard clustering) then the Dice co-efficient for the two paragraphs has a value of 1. As per the example below, the document term matrix using standard clustering techniques is calculated as follows:

|  | Paragraph 1 | Paragraph 2 |
| --- | --- | --- |
| people | 1 | 1 |
| company | 1 | 1 |
| latest | 1 | 1 |
| information | 1 | 1 |
| technology | 1 | 1 |
| copy | 1 | 1 |
| transfer | 1 | 1 |
| file | 1 | 1 |
| local | 1 | 1 |
| area | 1 | 1 |
| network | 1 | 1 |

The matrix shows there are 11 terms common to both paragraphs and that each paragraph contains 11 terms.

Calculating the Dice co-efficient:

$$\text{Dice Co-eff} = (2 \times 11)/(11 + 11)$$
$$= 1$$

However, if the keywords "information" and "technology" are associated to form a single entry in the document term matrix and if the keywords "local", "area" and "network" are associated to form a single entry in the document term matrix, then the Dice co-efficient for the two paragraphs is recalculated as 0.6. This is calculated as follows:

| Enhanced document term matrix | | |
| --- | --- | --- |
|  | Paragraph 1 | Paragraph 2 |
| people | 1 | 1 |
| company | 1 | 1 |
| latest | 1 | 1 |
| information | 0 | 1 |
| technology | 0 | 1 |
| copy | 1 | 1 |
| transfer | 1 | 1 |
| file | 1 | 1 |
| local | 0 | 1 |
| area | 0 | 1 |
| network | 0 | 1 |
| information technology | 1 | 0 |
| local area network | 1 | 0 |

(people, company, latest = 3 common terms; copy, transfer, file = 3 common terms)

The matrix shows there are six terms common to both paragraphs. Paragraph 1 has 11 terms and paragraph 2 has 8 terms, accordingly:

$$\text{Dice co-efficient} = (2 \times 6)/(11) + (8)$$
$$= 12/20$$
$$= 0.6$$

A Dice co-efficient of 0.6 may be considered a more accurate reflection of the similarities and differences between the subject matter of the two paragraphs.

Various phrase structures and grammatical structures have a high probability of identifying sets of key words that are associated in such a way that their inclusion as a single entry in a similarity matrix is likely to enhance its result. Adjacent key words consisting of two nouns, or a noun followed by a verb are common examples of the type of grammatical structures which would occur in a short phrase and are therefore likely to improve the quality of a similarity matrix. A verb followed by an adjective is a combination unlikely to occur in a short phrase and are therefore considered unlikely to enhance the quality of a similarity matrix.

Embodiments of the present invention will include a list of such phrase structures and grammatical structures. The text of a document being analysed will be examined for the presence of sets of key words that form such structures. This is in addition to the initial process of identifying these key words.

There will be exceptions, in some circumstances, whereby a particular set of key words that has been identified as conforming to a particular grammatical structure will not enhance the result of a similarity matrix. Other sets of key words that do not comply with one of these identified grammatical structures will, under some circumstances, enhance a similarity matrix.

Accordingly, embodiments of the present invention need to find a compromise between identifying only those grammatical structures that have a high probability of enhancing a similarity matrix and identifying too many grammatical structures that have a lower probability of enhancing a similarity matrix.

Figure 10:
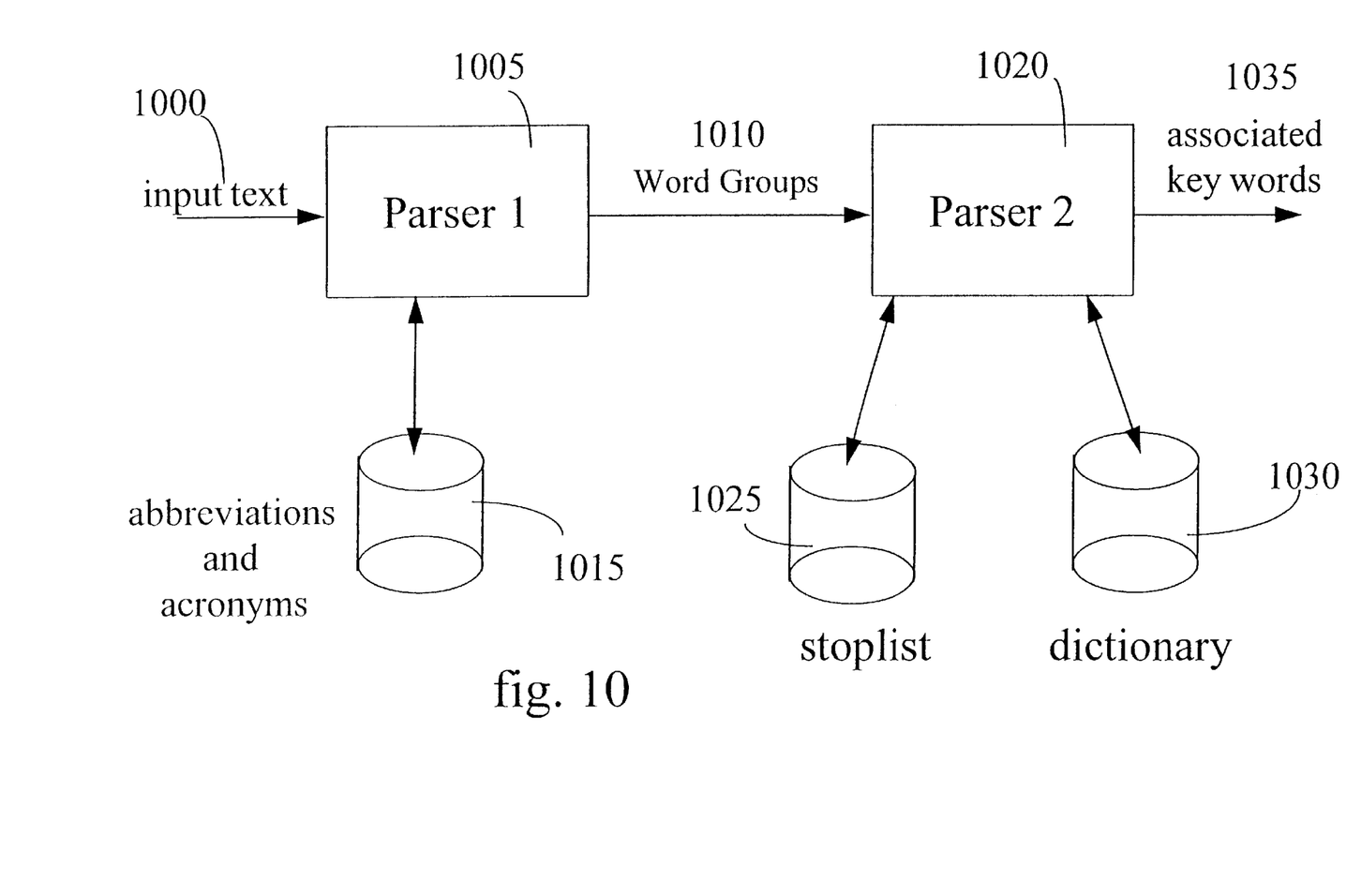
FIG. 10 shows a part of the Jasper agent of FIG. 1 that is used to identify associated key words.

FIG. 10 is a representation of the elements within the Jasper agent 105 that are used to identify associated keywords within a document.

Input text 1000 is downloaded from the W3 client 115 into a Jasper agent 105 where it is parsed by a first parser 1005, "Parser 1". Parser 1 1005 analyses the input text 1000 for abbreviations and acronyms.

This analysis is performed by comparing each word of input text 1000 against a database 1015 of abbreviations and acronyms. Parser 1 1005 tags identified abbreviations and acronyms.

Once abbreviations and acronyms within the input text 1000 have been tagged, the input text 1000 is then parsed again by Parser 1 1 005 so as to divide it up into word groups 1010, such as sentences, paragraphs, headers (such as HTML headers) or items isolated by blank lines.

Tags identifying abbreviations and acronyms allow the second parsing process of Parser 1 1005 to distinguish between full stops occurring at the end of an abbreviation or acronym and full stops at the end of a sentence. This helps to prevent spurious splitting of word groups 1010 mid sentence that may be caused by the presence of a full stop at the end of an abbreviation or acronym.

After being parsed for the second time by Parser 1 1005, the word groups 1010 are input to a second parser 1020, "Parser 2". Parser 2 1020 performs four operations on each word group 1010.

Firstly, Parser 2 analyses the word groups 1010 for words with unusual capitalisation. Such words are often used as the name of an entity, such as a corporate communications network or computer system. For example, imagine that a corporation has chosen to call one of its computer systems "Over". It may appear in the middle of a sentence as "Over" in which case it will be tagged as a word with unusual capitalisation. Other variations of this type that may be expected include OvEr, OveR. Words which have been identified as having unusual capitalisation are marked as "stop list" override.

A stoplist contains a list of words that typically do not reflect the information content of a document. For example, words such as "as", "is", "are", "the", "they", "where", "by", "my" etc.

A stoplist may also contain a list of prefixes and suffixes. The stoplist operates in this instance to reduce a word, with a prefix or suffix, or both, to a basic form without the prefix or suffix. This is known as stemming and examples are "manufacturing" which is reduced to "manufacture", "predetermination" to "determine", and "preselect" to "select".

Secondly, the word groups 1010 are compared against a "stoplist" database 1025.

Thirdly, words not in the stoplist and words marked as stoplist override are tagged as being relevant to the information content of the document.

Fourthly, each adjacent pair of words that have been tagged as being relevant to the information content of the document are further tagged as being a set of key words that may enhance the result of a similarity matrix. Preferably, each pair of words that are tagged as being relevant to the information content of a document and that are separated by words on the stop list, are not considered to form associated key words.

Finally, using a dictionary 1030 which categorises words as being one of verb/adverb/noun/adjective, these sets of key words are identified according to their grammatical structures. These structures are defined by the combination of word types in the keyword set, e.g. a first structure may be a noun followed by a verb and an alternate structure may be an adjective followed by a noun.

Sets of key words falling within a preferred list of grammatical structures are then tagged for inclusion in a similarity matrix as a single entry rather than as individual entries.

The following list is a list of preferred grammatical structures that are considered likely to enhance a similarity matrix

| List of Associated Keywords | |
|---|---|
| Word 1 | Word 2 |
| noun | noun |
| verb | noun |
| adjective | noun |
| ? | noun |
| ? | verb |
| noun | ? |
| verb | ? |
| adjective | ? |
| ? | ? | where "?" represents a word that is not in the dictionary used by the JASPER agent. Alternatively, "?" may also represent an acronym or a word appearing in the document with unusual capitalisation. Examples of such words include IT, LAN, WAN, xDSL and OveR.

In these examples, IT typically is used to mean Information Technology, LAN is Local Area Network, WAN is Wide Area Network, xDSL refers generically to a class of technology known as Digital Subscriber Line technology, and OveR may be a name of a corporate facility such as a communications networks.

These structures do not form a definitive list. Other structures for triple key word sets, such as an adjective followed by two nouns, as is the case for Local Area Network, may also be defined. Structures of four or more key word sets likely to enhance a similarity matrix may also be identified, such as a noun followed by an adjective followed by two nouns, as is the case for Asymmetric Digital Subscriber Line, although these are less common than sets of two or three keywords.

These grammatical structures provide a compromise between not using associated keywords and assuming that every pair or triple of adjacent keywords are associated keywords. For some topics, such as legal articles, particular categories may prove to be of a greater advantage than for technical articles. Accordingly, categories may be adjusted depending on the type of article being analysed by a JASPER agent 115.

As each of these associated key words will be entered into the Jasper key word store, as a single complex key word, they may also be used in the key word clustering technique, detailed above, that is used to enhance user profiles. This may improve the quality of pro-active searching performed by the JASPER agent 115. It may also be used by a search engine, or similar device, to identify documents containing associated key words that have been used to define the target information of the search.

The process is not limited to English language documents. Similar techniques may be used for other languages.

General Comments on the Embodiments Described Above.

The skilled addressee will appreciate in considering the embodiments described herein that other text summarisers may be used in place of ConText. For instance, ProSum is a summarising tool made available by British Telecommunications plc on the Internet, at the BT Labs shop located at http://www.labs.bt.com.

Although described in relation to locating information via Internet, embodiments of the present invention might be found useful for locating information on other systems, such as documents on a user's internal systems which are in HyperText.

What is claimed is:

1. Apparatus for determining a measure of similarity between at least a first and a second data set, said apparatus comprising:

i) input means for receiving at least said first and second data sets;

ii) processing means for identifying a set of keywords in at least the first of the data sets, the processing means having access to at least one rule set and identifying the set of keywords by use of said at least one rule set, the processing means further determining said measure of similarity; and iii) output means to output said measure of similarity; wherein said rule set includes a rule concerning relative location of data items in a respective data set, and wherein said processing means determines the measure of similarity by comparing at least one set of key words, identified by said processing means in the first data set, with a set of keywords comprising or derived from said second data set;

said relative location of data items in a respective data set comprises adjacent location of at least two potential key words with respect to each other in the data set, the processing means identifying such adjacent potential key words as together providing a single key word in an identified set of key words; and said at least one rule set comprises at least one of the following criteria:

1) a noun followed by a noun or a predetermined set of indicia;

2) a verb followed by a noun or a predetermined set of indicia;

3) an adjective followed by a noun or a predetermined set of indicia; and 4) a predetermined set of indicia followed by a noun or a verb or a further predetermined set of indicia;

the processing means identifying adjacent potential key words as together providing a single key word in an identified set of key words only when they meet said at least one criterion.

2. Apparatus as claimed in claim 1 further comprising information retrieval means and a data store, said first data set comprising data retrieved from an information base by said information retrieval means and said second data set comprising a set of key words stored in said data store.

3. Apparatus as claimed in claim 2, wherein said second data set defines a target data set for use in data retrieval, by said information retrieval means, from said information base whereby said first data set is identified by said processing means as containing said target data set when said measure of similarity exceeds a predetermined threshold.

4. Apparatus as claimed in claim 2, wherein said data store comprises a plurality of keyword sets identified, by said processing means, from a plurality of data sets retrieved, by said information retrieval means, from said information base, wherein said processing means defines a plurality of relationships between said data sets dependent on the measure of similarity calculated for each pair of data sets.

5. Apparatus as claimed in claim 1 further comprising information retrieval means, said first and second data sets comprising data retrieved from an information base by said information retrieval means, the processing means identifying a set of keywords in each of said first and second data sets and determining the measure of similarity by comparing the respective sets of key words.

6. A method of determining a level of similarity between first and second data sets, wherein said method comprises the steps of:

i) applying identifying tags to selected data items in at least the first of the data sets in accordance with at least a first rule;

ii) identifying a set of potential key words by reference to either the presence or the absence of said identifying tags;

iii) selecting sets of two or more potential keywords which are adjacent by applying at least a second rule;

iv) classifying each selected set of potential keywords as a single keyword;

v) generating a set of keywords which comprises each classified set of potential keywords as a single keyword, together with the remaining keywords from the identified set of potential keywords;

vi) comparing the generated set of keywords with a set of keywords either comprising or derived form the second data set; and said first rule relates at least in part to the grammatical category of the data items;

said at least a second rule comprises one or more rules from the following set:

1) a noun followed by a noun or a predetermined set of indicia;

2) a verb followed by a noun or a predetermined set of indicia;

3) an adjective followed by a noun or a predetermined set of indicia; and 4) a predetermined set of indicia followed by a noun or a verb or a further predetermined set of indicia.

* * * * *